United States Patent
Enomoto

(10) Patent No.: US 7,200,280 B2
(45) Date of Patent: Apr. 3, 2007

(54) IMAGE PROCESSING APPARATUS

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 605 days.

(21) Appl. No.: 10/252,831

(22) Filed: Sep. 24, 2002

(65) Prior Publication Data
US 2003/0072501 A1   Apr. 17, 2003

(30) Foreign Application Priority Data
Sep. 27, 2001   (JP)   .............. 2001-296300

(51) Int. Cl.
G06K 9/40   (2006.01)
H04N 1/38   (2006.01)
G02F 1/01   (2006.01)
(52) U.S. Cl. .............. 382/275; 358/463; 250/330
(58) Field of Classification Search .............. 382/149, 382/254, 260–269, 275, 312, 311; 250/330; 358/463, 461, 474
See application file for complete search history.

(56) References Cited

U.S. PATENT DOCUMENTS

| | | | | |
|---|---|---|---|---|
| 4,692,797 A | * | 9/1987 | Matsumoto | .............. 358/506 |
| 5,266,805 A | * | 11/1993 | Edgar | .............. 250/330 |
| 6,393,160 B1 | * | 5/2002 | Edgar | .............. 382/275 |
| 6,470,151 B1 | * | 10/2002 | Ohsawa | .............. 396/311 |
| 6,618,512 B1 | * | 9/2003 | Yamaguchi | .............. 382/319 |
| 6,718,069 B2 | * | 4/2004 | Mollov et al. | .............. 382/265 |
| 6,832,008 B1 | * | 12/2004 | Wada | .............. 382/275 |
| 6,947,083 B2 | * | 9/2005 | Nakajima | .............. 348/246 |

FOREIGN PATENT DOCUMENTS

| | | |
|---|---|---|
| JP | 6-28468 | 2/1994 |
| JP | 11-75039 | 3/1999 |
| JP | 11-338062 | 12/1999 |
| JP | 2001-24883 | 1/2001 |
| JP | 2001-24884 | 1/2001 |
| JP | 2001-24895 | 1/2001 |

* cited by examiner

Primary Examiner—Kanjibhai Patel
(74) Attorney, Agent, or Firm—Sughrue Mion, PLLC

(57) ABSTRACT

The image processing apparatus includes a detection device which detects an improper image portion of image information, a correction device which corrects the improper image portion, a display device which displays an image whose improper image portion has been corrected by the correction device and an instruction device which instructs to re-correct the improper image portion using the image displayed on the display device.

15 Claims, 3 Drawing Sheets

IMAGE PROCESSING APPARATUS

BACKGROUND OF THE INVENTION

The present invention belongs to the technical field of image processing for processing image information (image data), and more particularly, to an image processing apparatus capable of appropriately correcting an improper image portion caused on an image on which image data is reproduced, such as a defective image portion caused by flaws of a film, and the like.

Most of the images recorded on photographic films such as negative films and reversal films (which are hereinafter referred to as "films") are conventionally printed onto light-sensitive materials (photographic paper) by a technique generally called "direct exposure" in which an image on a film is projected onto the light-sensitive material for exposure.

In contrast, recently, a digital photoprinter has been in practical use. The digital photoprinter is arranged such that an image recorded on a film is read photoelectronically and is converted to digital signals, which are subjected to various kinds of image processing steps to produce recording image data, and a light-sensitive material is exposed to recording light beams modulated in accordance with the image data, whereby the light-sensitive material is output as a print on which the image is recorded. Further, the image data is also output to various recording mediums such as a CD-R, and a hard disk (HD) as an image file.

According to the digital photoprinter, the image is read photoelectronically and subjected to image processing steps as digital image data. Thus, in addition to the preferable correction of color and density, an image of high quality can be obtained by performing image processing steps such as gradation correction and sharpness correction which are basically impossible in a printer employing ordinary direct exposure.

Further, it is possible to output not only a print on which the image recorded on the film is reproduced but also a print on which image data (image file) received from a digital camera, and the like (otherwise, from a recording medium which includes the recorded image is reproduced.

Incidentally, there is a defective image portion, which is a serious factor for deteriorating the quality of an image, in an image output from a film acting as an original. The defective image portion is caused by foreign particles such as dust and dirt adhered to the film, a flaw of the film formed by friction, and the like. Further, in the images recorded by the digital camera, and the like, a similar defective image portion may be caused by so-called defective pixels such as the defects of CCD cells.

Conventional printers employing the direct exposure output a print by correcting the defective image portion in such a manner that an operator manually cleans a film or corrects an image (film) with a color material.

Whereas, in the digital photoprinters that photoelectrically read the images on a film or receive image data from digital cameras, and the like and process the image data as digital image data, it is possible to detect a defective image portion by analyzing the digital image data and to correct it by executing the image processing steps.

For example, JP 6-28468 A, JP 11-75039 A, JP 2001-24883 A, JP 2001-24884 A and JP 2001-24895 A each disclose an image processing apparatus for correcting a defective image portion caused by a foreign particle and a flaw making use of infrared light (IR) beams, which are not absorbed by the images recorded on a film but are shaded, absorbed and scattered by the foreign particle, the flaw, and the like. That is, in this image processing apparatus, when an image recorded on a film is photoelectrically read by a CCD sensor, and the like, in addition to the reading of a visible image through three R (red), G (blue), and B (blue) primary colors, the film is read with infrared light beams so as to detect the foreign particle and the flaw by the change of intensity of the infrared light beams.

In the image processing disclosed in the above publications or other image processing for correcting a defective image portion caused on an image on which image data is reproduced as a visible image (or on an image carried by the image data), the defective image portion is corrected by an image processing step such as interpolation of the image data after the defective image portion has been detected.

However, in the above image processing step, a portion where no image is defective may be detected as a defective image portion depending upon a picture, and the like and a defective image portion may not be always appropriately corrected depending on a size of the defective image portion and on a picture located at a position where a defective image portion exists. In this case, an improper image is output as a matter of course.

SUMMARY OF THE INVENTION

Accordingly, an object of the present invention for solving the problem of the conventional art is to provide an image processing apparatus capable of appropriately correcting an improper image portion regardless of a size of the improper image portion and regardless of a picture located at a position where the improper image portion exists in the image processing step for correcting the improper image portion caused on an image carried by image data (image information) such as the defective image portion caused by flaws and the like of a film when the image data obtained from the film and so on is output as a print.

In order to attain the object described above, the present invention provides an image processing apparatus comprising: detection means for detecting an improper image portion of image information; correction means for correcting the improper image portion; display means for displaying an image whose improper image portion has been corrected by the correction means; and instruction means for instructing to re-correct the improper image portion using the image displayed on the display means.

Preferably, when the detection means detected a plurality of improper image portions, one or more improper image portions to be corrected are selected and the correction means only corrects the thus selected improper image portions.

Preferably, the display means displays the image so that at least one of the improper image portion having been detected by the detection means and the improper image portion having been corrected by the correction means can be identified.

Preferably, the display means displays the image whose improper image portion is to be corrected in contrast with the image whose improper image portion has been corrected.

Preferably, the instruction means comprises means for instructing at least one of a correcting condition of the improper image portion and a correcting method of the improper image portion when re-correction is performed.

Preferably, the improper image portion is re-corrected according to the instructed correcting condition and correcting method.

It is preferable that the image processing apparatus further comprises: extraction means for extracting an improper image portion which can be difficult to correct in the correction means from improper image portions detected by the detection means; and suggestion means for suggesting existence of the improper image portion whose correction can be difficult.

DETAILED DESCRIPTION OF THE INVENTION

An image processing apparatus of the present invention will be described below in detail with reference to a preferable embodiment shown in the accompanying drawings.

Figure 1:
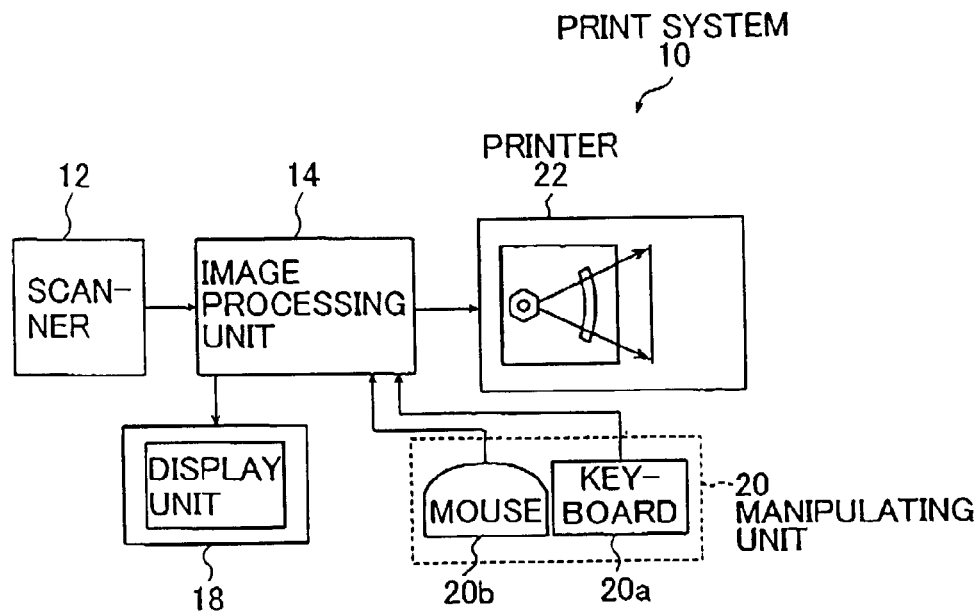
FIG. 1 is a block diagram of an example of a print system making use of an image processing apparatus of the present invention.

FIG. 1 shows a block diagram of an example of a print system making use of the image processing apparatus of the present invention.

The print system 10 shown in FIG. 1 reads an image recorded on a film F photoelectrically and outputs the image as a print. The print system 10 basically comprises a scanner (image reading unit) 12, an image processing unit 14, a display unit 18 connected to the image processing unit 14, a manipulating unit 20 (keyboard 20a and mouse 20b), and a printer 22.

Figure 2:
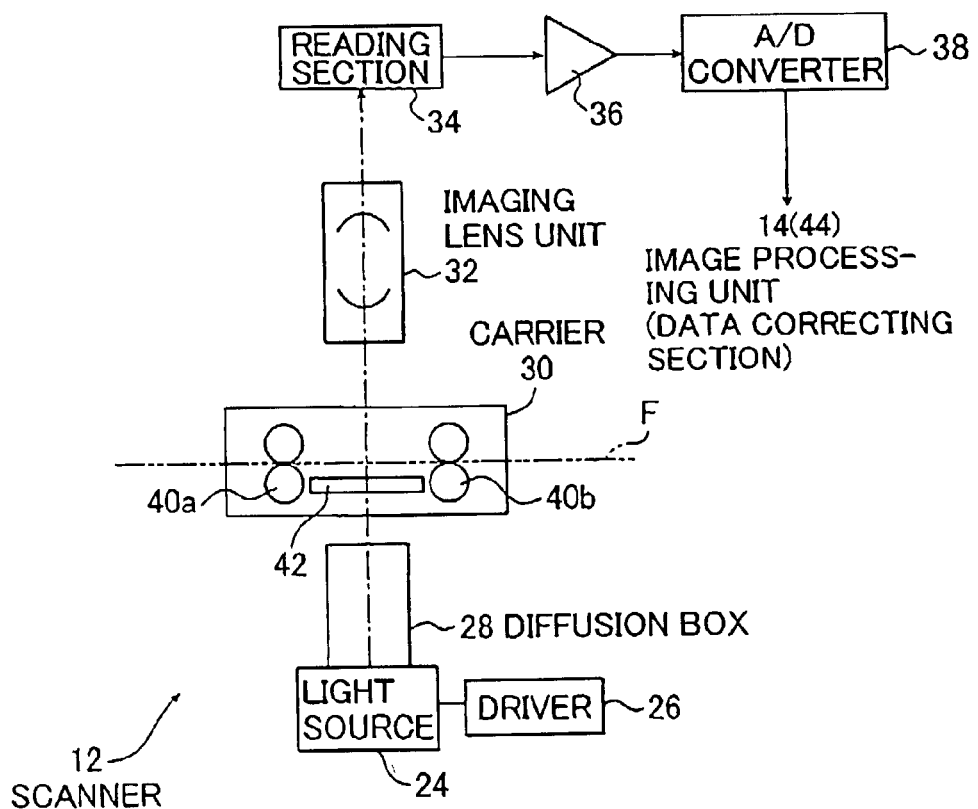
FIG. 2 is a conceptual view of a scanner of the print system shown in FIG. 1.

The scanner 12 is a device for photoelectrically reading the images recorded on the film F. As shown in the conceptual view of FIG. 2, the scanner 12 comprises a light source 24, a driver 26, a diffusion box 28, a carrier 30, an imaging lens unit 32, a reading section 34, an amplifier 36, and an analog/digital (A/D) converter 38.

In the scanner 12 of the illustrated example, the light source 24 utilizes light emitting diodes (LEDs) and is composed of three types of LEDs for emitting R (red) light beams, G (green) light beams, and B (blue) light beams as visible light beams for reading the images recorded on the film F, and an LED for emitting infrared light (IR light) beams as invisible light beams for detecting a defective image portion caused by foreign particles attached to the film F and flaws of the film F, and these LEDs are disposed in the light source 24. The light source 24 arranged as described above is driven by the driver 26 and sequentially emits the visible light beams and the infrared light beams.

The light beams emitted from the light source 24 are incident on the diffusion box 28. The diffusion box 28 makes the light beams, which are incident on the film F, uniform in a film surface direction.

The carrier 30 intermittently transports the film F so as to transport and hold the respective images recorded on the film F (respective frames) to and at a predetermined reading position. A plurality of types of carriers 30 are prepared according to film sizes, and the like and are arranged so as to be detachably mounted on the main body of the scanner 12.

In the illustrated example, the carrier 30 has transport roller pairs 40a and 40b disposed across the predetermined reading position to transport the film F in a lengthwise direction and a mask 42 for regulating the reading region of each frame at the reading position.

The imaging lens unit 32 images the projected light beams from the film F at a predetermined position of the reading section 34.

The reading section 34, which photoelectrically reads the film F using an area CCD sensor, reads the entire surface of one frame of the film F regulated by the mask 42 of the carrier 30 (reading of an image by areal exposure).

When the film F is read by the scanner 12 arranged as described above, first, the film F is transported by the carrier 30 so as to transport a frame to be read (ordinarily, first or final frame) to the reading position.

Next, the red LED, for example, of the light source 24 is driven by the driver 26 and emits red light beams. The R light beams are incident on the reading position after the quantity thereof has been made uniform in the surface direction of the film F by the diffusion box 28. The R light beams are incident on the frame held at the reading position and passes therethrough to form projected light beams that carry the image recorded on the frame. This projected light beams are imaged at the predetermined position of the reading section 34 (the light receiving surface of the area CCD sensor) by the imaging lens unit 32, and the R image of the frame is read photoelectrically.

Likewise, the G and B images of the frame are read by sequentially emitting the green and blue LEDs of the light source 24. Finally, the frame is read with infrared light beams by emitting the infrared LED of the light source 24, thereby the reading of the frame is finished. Accordingly, the scanner 12 outputs four-channel image signals of the R (red), G (green) and B (blue) visible images and the infrared image (non-visible image).

When the image of one frame has been finished, the carrier 30 transports the film F so as to transport the image of a frame to be read next to the reading position.

The signals output from the reading section 34 are amplified by the amplifier 36, converted to digital image signals by the A/D converter 38, and supplied to the image processing unit 14 (data correcting section 44).

In the print system 10, the scanner 12 usually reads the image recorded on one frame twice. That is, the scanner 12 carries out fine scan for reading the image at a high resolution to output a print, and the like and prescan for reading the image at a low resolution prior to the fine scan to determine the reading conditions of the fine scan and the image processing conditions in the image processing unit 14 (image correcting section 54).

At this time, the output signals in the prescan and the output signals in the fine scan are basically the same data except that they have different resolutions and different output levels. Note that, in this example, the infrared image is not read in the prescan.

Further, in the print system making use of the present invention, the scanner (image reading unit) is by no means limited to the one using the area sensor and may be a scanner for reading an image by so-called slit scan using a four-line CCD sensor for reading the infrared image, in addition to the red, green and blue images.

Otherwise, the scanner may be such a scanner that it employs a white light source for emitting light beams including the wavelength components of R, G, B, and IR light beams in place of the LEDs for emitting these light beams and reads the images of these four colors by sequentially inserting R, G, B, and IR filters.

Figure 3:
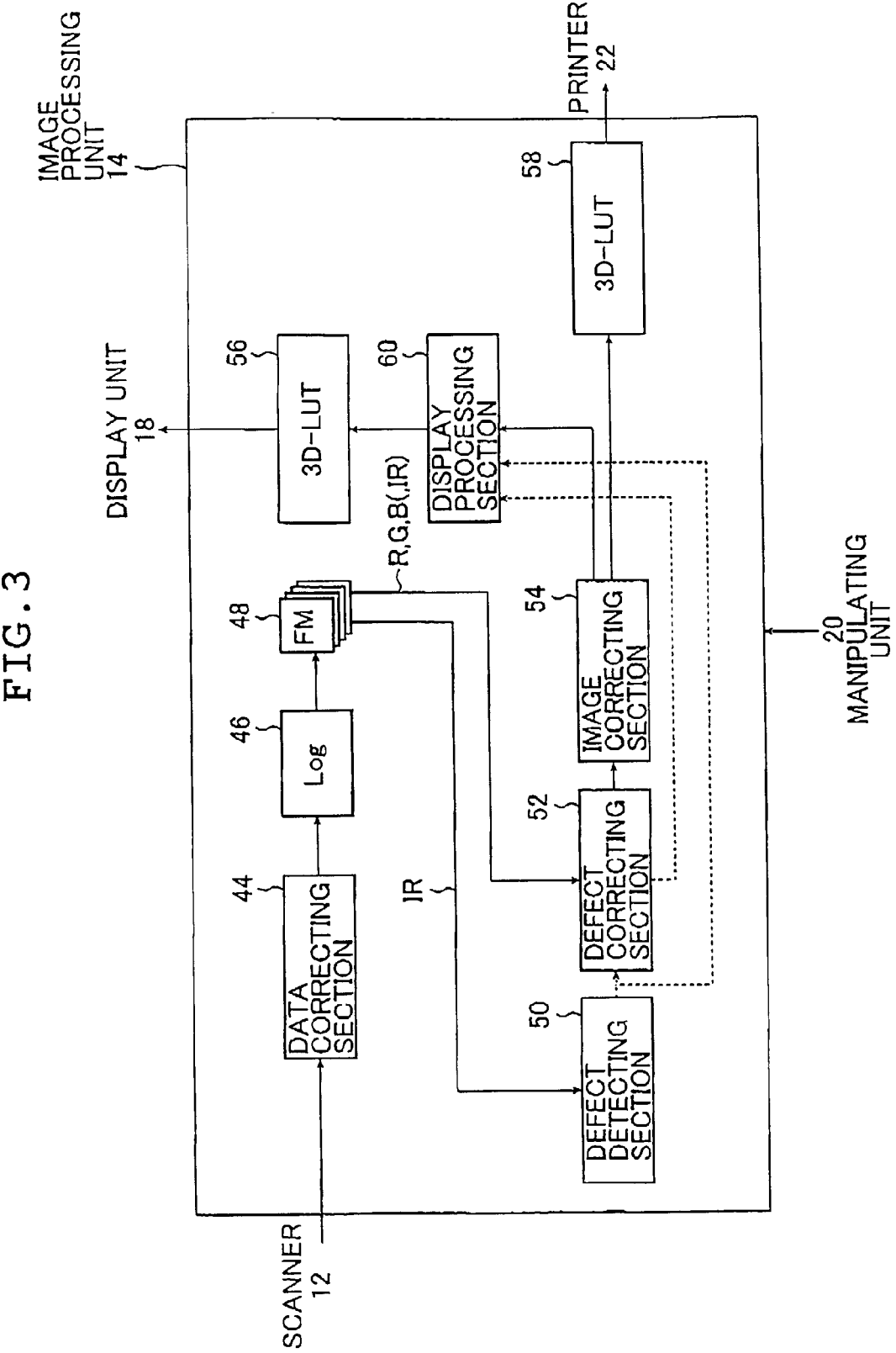
FIG. 3 is a block diagram of an image processing unit of the print system shown in FIG. 1.

As described above, the digital image signals output from the scanner 12 are supplied to the image processing unit 14. FIG. 3 shows a block diagram of the image processing unit 14.

As shown in FIG. 3, the image processing unit 14 comprises the data correcting section 44, a Log converter 46, frame memories 48 (hereinafter, referred to as "FMs 48"), a defect detecting section 50, a defect correcting section 52, the image correcting section 54, a data converting sections (3D-LUTs) 56 and 58, and a display processing section 60.

Note that the image processing unit 14 may have a processing path that is branched downstream of the Log converter 46 (in a data flow direction) and connected to the data converting section 56 to process prescan data and display a simulation image for verification.

The data correcting section 44 is a section for subjecting the R, G, B, and IR image data output from the scanner 12 to a predetermined correction such as DC offset correction, dark current correction, and shading correction.

The Log converter 46 subjects output data having been processed in the data processing section 44 to Log conversion through, for example, a look-up table (LUT) and the like to obtain digital image information (image (density) data).

The R, G, B, and IR image data having been converted in the Log converter 46 are stored in the corresponding FMs 48. In the illustrated example, the respective image data of the images (image file) supplied from a digital camera, an image recording medium, and the like is also supplied to the corresponding FMs 48 from an interface (I/F) and stored therein.

The IR image data (hereinafter, referred to as "IR data") of the image data stored in the FMs 48 is read out by the defect detecting section 50 (hereinafter, referred to as "detecting section 50").

The detecting section 50 is a section where a defective image portion, which is caused by flaws of the film F and foreign particles such as dust and the like adhered to the film F, are detected.

As known well, when the film F has foreign particles and flaws, both R, G, and B visible light beams and invisible light beams such as infrared light beams are absorbed, shaded, and scattered by the foreign particles and the flaws. Accordingly, when the foreign particles and the like exist on the film F, the intensity of the projected light beams from the film F, which impinge on the positions of the foreign particles and the like and then are incident on the reading section 34 (CCD sensor), is reduced.

In contrast, as to an image (visible image) recorded on the film F, R, G, and B visible light beams are absorbed depending on the image, and the intensity of the resultant projected light beams are changed thereby. However, IR light beams pass through the film F without being absorbed by the image at all. As a result, when no foreign particle or the like exists on the film F, the IR light beams basically have the same intensity over the entire surface of one image (one frame), and IR data is made uniform on all the pixels of the one image. That is, when the film F has foreign particles and the flaws, the intensity of the IR light beams having passed through the film F, that is, IR data varies depending on the foreign particles and the flaws.

The detecting section 50 is a section for detecting a defective image portion by means of the IR data making use of the above variation, and supplies a result of detection of the defective image portion (for example, the information of the pixel position of the defective image portion) to the defect correcting section 52 and the display processing section 60.

Note that the method of detecting the defective image portion caused by the foreign particles, the flaws, and the like of the film F is not limited to the above method using the IR light beams, and various known methods can be used.

Further, in the present invention, when a print is output from image data (image file) supplied from a scanner for reading a reflecting original, a digital camera, and the like, a defective image portion may be detected also by the known methods. An exemplary method includes analyzing an image and detecting a defective image portion making use of the continuity of pixels, the color balance of the defective image portion with peripheral pixels, and the like.

In contrast, the R, G, and B image data and further the IR data stored in the FMs 48 are processed in the defect correcting section 52.

The defect correcting section 52 is a section for correcting the defective image portion according to the result of detection of the defective image portion detected by the detecting section 50.

The method of correcting the defective image portion in the defect correcting section 52 is not particularly limited and various known methods may be utilized which include an interpolation method, a luminance adjustment method and a gain method.

The interpolation method corrects the defective image portion using the image data of the peripheral pixels of the defective image portion. Specifically, the luminance and color of a defective image portion to be corrected is newly calculated from the luminance and color of the peripheral region of the defective image portion by interpolation. Then, a value D3 of each pixel of the defective image portion having been corrected is determined by the following expression:

$$D3 = \alpha \times D1 + (1-\alpha)D2$$

wherein the value of each pixel of the defective image portion determined by the calculation for the interpolation (the value may be R, G, and B image (density) data or data showing hue, brightness and saturation) is D1, the original value of each pixel is D2, and an intensity of correction is α.

The luminance adjustment method is a method of correcting the respective pixels of the defective image portion by adjusting luminance. Specifically, an amount of correction of luminance of the defective image portion to be corrected is calculated based on the amount of change of IR data in the defective image portion, and a luminance value L3 of each pixel of the defective image portion having been corrected is determined using the following expression:

$$L3 = \alpha \times L1 + (1-\alpha)L2$$

wherein the luminance value of each pixel of the defective image portion having been corrected according to the amount of correction of luminance is L1, the original luminance value of each pixel is L2, and an intensity of correction is α.

The R, G, and B image data of each pixel is corrected using the thus determined corrected luminance value L3 of each pixel.

Further, the gain method is a method of presuming a damping amount of the quantity of light beams of the defective image portion caused by the flaws of the film F and the foreign particles such as dust adhered to the film F from the IR light (IR data) and correcting the R, G, and B image data according to the damping amount of the quantity of light beams.

Note that various known methods can be used as the methods of detecting and correcting the defective image portion of the image carried by the image data (image information), as already described above. For example, the methods disclosed in commonly assigned JP 11-75039 A, JP 2001-24883 A, JP 2001-24884 A, and JP 2001-24895 A are preferable.

In the print system 10, the image processing unit 14 is arranged such that an image whose defective image portion has been corrected in the defect correcting section 52 and the image correcting section 54 is displayed on the display unit 18, and the defect correcting section 52 re-corrects the defective image portion or cancels the correction of the defective image portion (processing for returning corrected image data to original image data) in response to an instruction input by an operator using the displayed image as well as this routine is repeated until an appropriate image can be obtained (until an instruction for output is issued), which will be described later in detail. Further, at this time, when there are a plurality of defective image portions, it is preferable to select, to designate and to re-correct defective image portions having the same feature at a time.

When the defective image portion is re-corrected, the correcting conditions such as the number of taps of interpolation, an interpolating method (spline interpolation and bi-linear interpolation), the intensity of correction (for example, the intensity of correction $\alpha$), and the like may be changed and the correcting methods such as the interpolation method, the luminance adjustment method and the gain method (correction algorithm may be changed or selected. Accordingly, a plurality of correcting methods including the interpolation method, the luminance adjustment method, and the gain method, and other correcting methods are set as preferable embodiments in the defect correcting section 52.

Further, in the present invention, the correcting method and the correcting conditions of the defective image portion corrected by the defect correcting section 52 may be changed according to the characteristics of the defective image portion detected by the detecting section 50 (for example, whether the defective image portion is caused by foreign particles or flaws, whether the flaws are located on the front surface or the back surface of the film F, and the like). Further, it is more preferable that the correcting method and the correcting conditions of the defective image portion be automatically changed according to the characteristics and level of the defective image portion (the size of the defective image portion and an amount of variation of IR data) by, for example, increasing the number of taps of interpolation when the defective image portion has a large size.

The publications described above can be referred to also in this respect.

The print system 10 may have a function for storing the image processing conditions employed in the defect correcting section 52, which will be described later, in a database in correspondence to the identification information of the respective frames as disclosed in JP 11-338062 A, and the like so that the image of a simultaneous print is caused to agree with the image of a reprint (agreement of print between the simultaneous print and the reprint).

At this time, it is preferable to store a result of correction of the defective image portion of an image corrected by the defect correcting section 52, specifically, a corrected position (coordinate, pixel number, positional information, and the like) a level of correction (intensity of correction), a correcting method, and the like in the database together with the image processing conditions for causing the simultaneous print to agree with the reprint. Further, when a different correcting method and different correcting conditions are employed to each of defective image portions, it is preferable to store the conditions and the like for each defective image portion.

The image data of a visible image whose defective image portion has been corrected by the defect correcting section 52 is processed in the image correcting section 54.

The image correcting section 54 is a section for executing various kinds of image processing including various kinds of image correction processing steps such as enlargement/reduction processing (electronic magnification processing), color/density correction, gradation conversion, sharpness processing (sharpness enhancement), and image density dynamic range compression (application of a dodging effect by image data processing) and special processing steps such as a soft focus processing and cross filter processing. Note that the enlargement/reduction processing step may be executed before the defective image portion is corrected.

These various kinds of image processing steps may be executed by a known method using a look-up table (LUT), matrix calculation, a filter processing, and the like. Further, the image processing conditions are basically set by analyzing an image using prescan image data.

The image data having been processed in the image correcting section 54 is processed in the display processing section 60 and the data converting section 56 or in the data converting section 58.

The data converting section 56 is a section for converting the image data to image data corresponding to an image displayed on the display unit 18 using a three-dimensional look-up table (3D-LUT). In contrast, the data converting section 58 is a section for converting the image data to image data corresponding to an image output by the printer 22 using a three-dimensional look-up table (3D-LUT) in the same way.

The display processing section 60 disposed upstream of the data converting section 56 is a section for processing the image data so as to identify the result of detection of the defective image portion of the image and the result of correction of the defective image portion in the image displayed on the display unit 18 so that they can confirmed on the displayed image.

That is, a result of detection of the defective image portions detected by the detecting section 50 and the information as to the defective image portions having been corrected by the defect correcting section 52 are supplied to the display processing section 60 as shown by dotted lines in FIG. 3. In response to the result of detection and the information, the display processing section 60 processes the defective image portions having been detected in the detecting section 50 and the defective image portions having been corrected in the defect correcting section 52 by surrounding them with frames or otherwise emphasizing them by the use of coloring, flashing or highlight so that they can be specified and identified in the image displayed on the display unit 18.

In the present invention, while both the positions of the defective image portions having been detected by the detecting section 50 and the positions of the defective image portions having been corrected by the defect correcting section 52 may displayed but any ones of both the positions may be displayed. Note that in any of the cases, it is preferable to display all the defective image portions having been detected or corrected so that they can be identified. The present invention basically displays the image on the display unit 18 after the defective image portion has been corrected, but when the detecting section 50 detected a plurality of defective image portions, the image may be displayed prior to correcting the defective image portions in such a manner that the defective image portions as detected in the image which is not corrected can be identified, thereby making it possible to select one or more defective image portions to be corrected. This will be described later.

Further, when there is a defective image portion that is not corrected by the defect correcting section 52 although the detecting section 50 detected un defect or a defective image portion that has been corrected although the detecting section 50 did not detect any defect, it is preferable to display the former and latter defective image portions so as to discriminate them by changing the color or the shape of the frames thereof or by coloring them with different colors so that they can be discriminated from each other.

Further, it is preferable that the display processing section 60 extract defective image portions having a possibility that they cannot be sufficiently corrected in the defect correcting section 52 (hereinafter, referred to as "correction-difficult defective image portion") and output a result of extraction.

A method of outputting the result of extraction of the correction-difficult defective image portions is not particularly limited, and various methods can be used. An exemplary method includes warning, when the correction-difficult defective image portions are extracted, the existence of them by a sound, display, and the like. A preferable method includes displaying defective image portions extracted as the correction-difficult defective image portions among those detected by the detecting section 50 and those corrected by the defect correcting section 52 in such a manner that the correction-difficult defective image portions can be differentiated from the other defective image portions. Note that any one of the display and the warning may be executed or both of them may be executed together.

Further, the defective image portions having been detected by the detecting section 50 may not be displayed and only the correction-difficult defective image portions may be displayed so as to be identified.

Note that the correction-difficult defective image portion is a defective image portion in which the image processing described above seems to have difficulty with proper correction. Examples include a defective image portion existing in, for example, the face of a person (in particular, eyes and the like), a defective image portion existing in a busy scene (which has spatially quick movements), a defective image portion in which the peripheral picture is busy and a thick (large) defective image portion. The defective image portions are usually corrected by interpolation but after the defective image portions have been corrected, these regions form an unnatural image giving a feeling of strangeness.

The correction-difficult defective image portion may be extracted using a known method such as image analysis, extraction of a face by the image analysis, finding of a spatial frequency, and the like.

Figure 4:
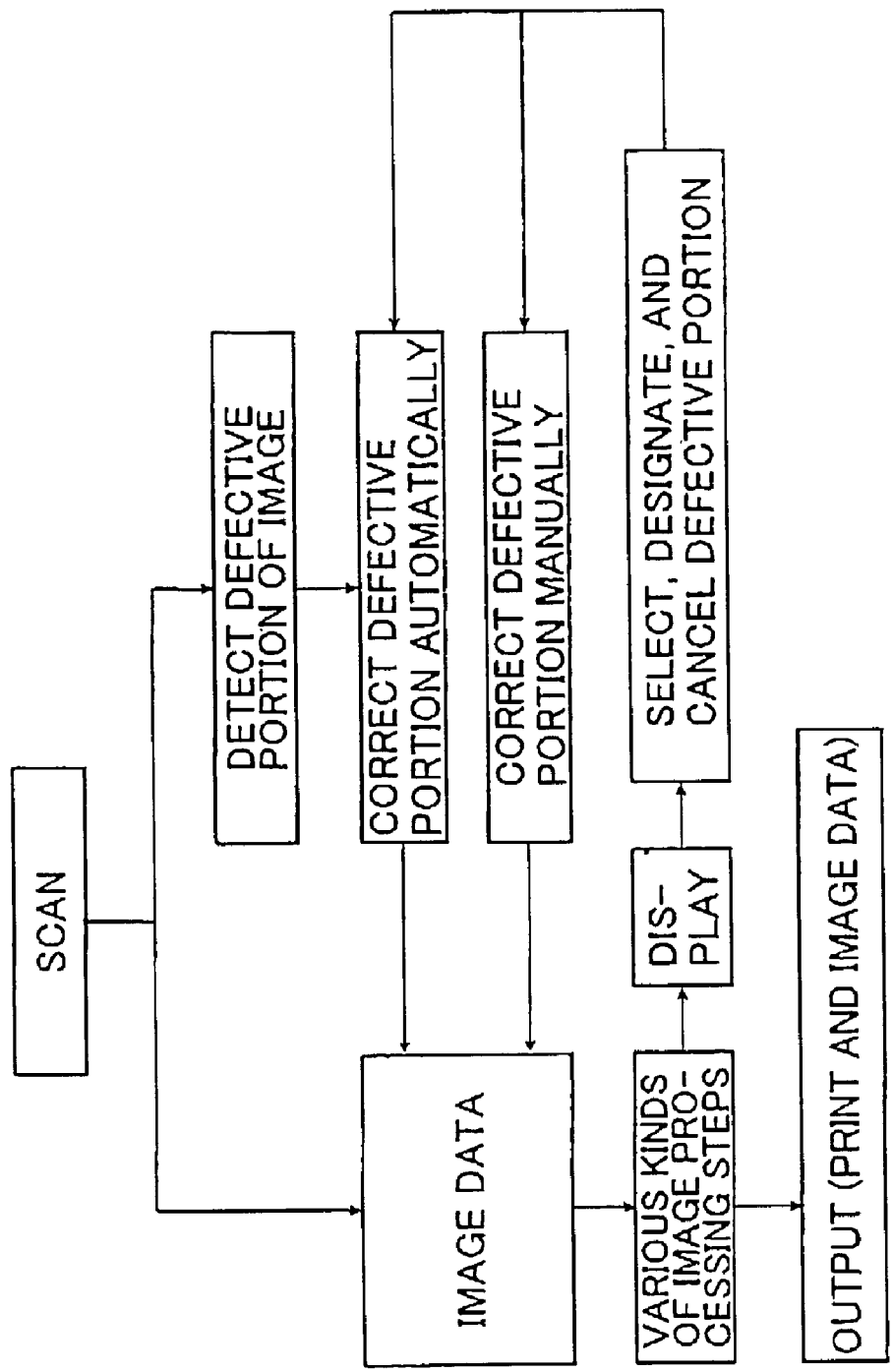
FIG. 4 is a flowchart of an image processing step executed in the print system shown in FIG. 1.

The image processing apparatus of the present invention will be described below in more detail by explaining the operation of the image processing unit 14 with reference to the flowchart shown in FIG. 4.

The scanner 12 reads (scans) an image in four channels as described above and outputs a result of reading (signals) obtained through R, G, B, and IR light beams to the image processing unit 14.

The respective signals having been supplied to the image processing unit 14 are subjected to data processing steps such as shading correction in the data correcting section 44. The processed signals are then subjected to log conversion in the Log converter 46, and the thus obtained image data are stored in the corresponding FMs 49.

When the respective image data have been stored in the FMs 48, the detecting section 50 reads out the IR data, detects defective image portions of the image as described above, and sends a result of detection to the defect correcting section 52 and the display processing section 60.

An operator may select and designate one or more defective image portions to be corrected in the defect correcting section 52 when the detecting section 50 detected a plurality of defective image portions.

In this case, the display processing section 60 may receive image data whose defective image portions are not corrected in the defect correcting section 52 and which has been subjected to image processing in the image correcting section 54, perform the image processing to display the result of detection of the defective image portions as detected by the detecting section 50 in an identifiable manner and display the image on the display unit 18 so that the operator can select and designate one or more defective image portions to be corrected from the displayed image.

It should be noted here that the method used for making the detected defective image portions identifiable may be the one described above as by surrounding them with frames or coloring them. The defective image portions to be corrected may also be selected and designated from the displayed image through the manipulating unit 20 by a known means utilizing GUI (Graphical User Interface) or the like. Alternatively, the defective image portions to be corrected may be designated by selecting not the defective image portions to be corrected but the defective image portions not to be corrected.

The defect correcting section 52 having received the result of detection of the defective image portions reads out the R, G, B image data (and further the IR data) from the FMs 48, corrects the defective image portions (automatic correction) by, for example, the interpolation method described above, and sends the information of the defective image portions having been corrected to the display processing section 60. Note that the defect correcting section 52 may change the method and conditions for correcting the defective image portions in accordance with the characteristics of the defective image portions.

As described above, when one or more defective image portions to be corrected are designated from among a plurality of detected defective image portions, the defect correcting section 52 corrects only the designated defective image portions, which is a matter of course.

When the defect correcting section 52 has competed the automatic correction of the defective image portions, the image correcting section 54 subjects the image data whose defective image portions have been corrected to the predetermined image processing steps such as the color/density correction and the gradation conversion.

Next, the display processing section 60 processes the image data so as to surround the portions corresponding to the defective image portions having been detected by the detecting section 50 and to the defective image portions having been corrected by the defect correcting section 52 using the information of the result of detection of the defective image portions and the information of the corrected defective image portions so that the detected defective image portions can be identified from the corrected defective image portions. Otherwise, correction-difficult defective image portions are further extracted as described above, and the image data is processed such that the correction-difficult defective image portions can be displayed so as to be differentiated from the other defective image portions. Note that a result of detection of the correction-difficult defective image portions may be notified by issuing a warning indicating the existence of them in place of displaying them.

The image data having been processed in the display processing section 60 is converted in the data converting section 56 to image data corresponding to an image displayed on the display unit 18, and the image whose defective image portions have been corrected is displayed on the display unit 18.

Image display is preferably performed so as to contrast the image whose defective image portions are to be corrected with the image whose defective image portions have been corrected.

Examples of the method of displaying these images in contrast include a method of displaying the image before the correction is made and the image after the correction has been made on the display unit 18 in a horizontal or vertical manner and a method of displaying these images alternately (by toggling).

The operator checks the image displayed on the display unit 18, and when there is a defective image portion that is not yet corrected, a defective image portion that has been insufficiently corrected and must be re-corrected, a defective image portion having been improperly corrected, or a portion having been corrected due to erroneous detection by the detecting section 50, the operator selects the defective image portion that must be re-corrected, the defective image portion for which the correction having been executed in the defect correcting section 52 must be cancelled, and the like and instructs and inputs them using the manipulating unit 20.

Further, when necessary, the operator selects whether the re-correction of the defective image portion is executed by the conditions set in the defect correcting section 52 (automatic correction) or by changing the correcting conditions and the correcting method (manual correction). When the re-correction is executed manually, the operator input the correcting conditions and the correcting method described above. Note that when a plurality of defective image portions must be re-corrected, the correction method may be selected from the automatic correction and the manual correction for each of the defective image portions.

Further, the operator may execute the so-called verification of the color/density adjustment, the gradation adjustment and the like of the image, when necessary, together with the above processing steps.

The verification may be instructed and input by a known method using a graphic user interface (GUI) through the manipulating unit 20 and the like.

Further, the operator may select and designate a defective image portion to be corrected by himself or herself to correct the defective image portion using, for example, commercially available retouch software by manipulating the mouse 20*b* and the like.

When all the necessary information has been input (or in response to an instruction for starting re-correction), the defect correcting section 52 re-corrects the instructed defective image portion (automatically or manually) and cancels the correction applied to the instructed defective image portion (restores the image data thereof to original image data).

Subsequently, the image correcting section 54 subjects the image whose defective image portion has been re-corrected by the image correcting section 54 to the predetermined image processing steps, and the image whose defective image portion has been re-corrected is displayed on the display unit 18 as in the above case. Note that, in the image having been re-corrected, it is preferable that the display processing section 60 process the defective image portion having been re-corrected and the defective image portion whose correction has been cancelled so that they are differentiated when displayed on the display unit 18 in order to identify them from the other defective image portions.

When the operator checks the image and determines that it must be re-corrected again, he or she selects and instructs the defective image portion to be re-corrected again, a re-correction processing step is executed in the same manner and the image having been re-corrected again is displayed on the display unit 18.

In contrast, when the operator checks the image and determines that it is appropriately corrected, he or she instructs to output the image. In response to the instruction, the data converting section 58 converts the image data having been processed in the image correcting section 54 to image data corresponding to an image output by the printer 22, and outputs the image data to the printer 22. Otherwise, the data converting section 58 converts the image data having been processed in the image correcting section 54 to a predetermined image format and outputs it as an image format.

That is, according to the present invention, since the re-correction of a defective image portion and the cancel of the correction applied to a defective image portion can be instructed, as necessary, by confirming a result of correction of defective image portions, it is possible to output an image of high quality by appropriately correcting all the defective image portions of the image.

Further, since the re-correction processing step can be executed by selecting the manual correction or the automatic correction in accordance with the state of a defective image portion, the processing efficiency, workability, operability, and the like of the correction of a defective image portion can be improved.

The printer 22 is a known color printer. An example includes a printer for outputting a photosensitive material such as photographic paper as a print after the photosensitive material has been two-dimensionally scan exposed with, for example, light (laser) beams, which have been modulated in accordance with, for example, R, G, and B image data supplied so as to record a latent image thereon, and after the thus exposed photosensitive material has been subjected to wet processing including development, fixing, and washing so that the latent image is rendered visible, and then has been dried.

Note that, in the printer 22 of the present invention, the image data having been processed in the image correcting section 54 may be converted to, for example, a JPEG image file and output to a recording medium such as a CD-R, in addition to outputting as the print.

While the image processing apparatus of the present invention has been described above in detail, the present invention is by no means limited to the above embodiment and it goes without saying that various improvements and modifications can be made within the range which does not depart from the gist of the present invention.

For example, while the detection and the like of the defective image portion is executed using the fine scan data in the embodiment described above, the present invention is not limited thereto, and an image may be read with IR light beams in the prescan and a defective image portion may be detected using the data obtained. Further, the prescan data may be used to correct the defective image portion and display and confirm the image whose defective image portion has been corrected. Then, the defective image portion may be corrected by correcting the fine scan data according to a result of the correction. While it is needless to say that the fine scan data is preferably used from the view point of image quality and accuracy, it is preferable to use the prescan data from the view point of processing speed and the like. Thus, they may be appropriately selected according to the desired image quality, productivity, and the like.

The embodiment described above refers to the correction of defective image portions caused by a flow of a film, foreign particles adhered to the film or the like but this is not the sole case of the present invention. In addition to this, the present invention is advantageously applicable to various corrections of improper image portions, for example to correct red-eye of an image, correct a defective image portion due to dust adhered to the CCD sensor of the reading section 34, correct freckles and blotches of a person and make wrinkles fade away.

As described above in detail, according to the image processing apparatus of the present invention, when images of a film are read photoelectrically and reproduced on prints and the like, image processing for correcting improper image portions such as defective image portions caused by flaws of the film or the like can be performed to appropriately correct all the defective image portions at an excellent processing efficiency with good workability and operability, thereby outputting images of high quality.

What is claimed is:

1. An image processing apparatus comprising:
   detection means for detecting an improper image portion of image information;
   correction means for correcting the improper image portion;
   display means for displaying an image whose improper image portion has been corrected by the correction means; and
   instruction means for instructing to re-correct the improper image portion using the image displayed on the display means,
   wherein when the detection means detected a plurality of improper image portions, one or more improper image portions to be corrected are selected and the correction means only corrects the thus selected improper image portions.

2. The image processing apparatus according to claim 1, wherein the display means displays the image so that at least one of the improper image portion having been detected by the detection means and the improper image portion having been corrected by the correction means can be identified.

3. The image processing apparatus according to claim 1, wherein the display means displays the image whose improper image portion is to be corrected in contrast with the image whose improper image portion has been corrected.

4. The image processing apparatus according to claim 1, wherein the instruction means comprises means for instructing at least one of a correcting condition of the improper image portion and a correcting method of the improper image portion when re-correction is performed.

5. The image processing apparatus according to claim 4, wherein the improper image portion is re-corrected according to the instructed correcting condition and correcting method.

6. The image processing apparatus according to claim 1, wherein said detection means detects an improper image portion in the image information by using infrared image data corresponding to the image information.

7. The image processing apparatus according to claim 1, wherein the correction means corrects the improper image portion of the image information by interpolating between the image information of a peripheral region of pixels adjacent to said improper image portion.

8. The image processing apparatus according to claim 1, wherein said detection means detects an improper image portion in the image information by evaluating the continuity of adjacent pixel data.

9. The image processing apparatus according to claim 1, further comprising:
   a storage means for storing a position of the improper image portion and an amount of correction performed on the improper image portion.

10. The image processing apparatus according to claim 1, further comprising:
    an image adjusting means for adjusting the corrected image information for at least one of enlargement, reduction, color density, gradation, sharpness, soft focus processing and cross filter processing.

11. The image processing apparatus according to claim 1, wherein the display means displays the image whose improper image portion is to be corrected, and one or more improper image portions to be corrected are selected from the displayed image by an instruction input from a user through the instruction means.

12. The image processing apparatus according to claim 1, wherein the display means displays the improper image portion having been corrected by the correction means with at least one of a surrounding frame, a distinguishing coloring, a flashing of the improper image portion and a highlighting.

13. The image processing apparatus according to claim 1, wherein the display means displays the image whose improper image portion is to be corrected and the image whose improper image portion has been corrected horizontally, vertically or alternately.

14. An image processing apparatus comprising:
    detection means for detecting an improper image portion of image information;
    correction means for correcting the improper image portion;
    display means for displaying an image whose improper image portion has been corrected by the correction means;
    instruction means for instructing to re-correct the improper image portion using the image displayed on the display means;
    extraction means for extracting an improper image portion which can be difficult to correct in the correction means from improper image portions detected by the detection means; and
    suggestion means for suggesting existence of the improper image portion whose correction can be difficult.

15. An image processing apparatus comprising:
    a display device for displaying image data for displaying corrected and re-corrected image data;

a storage for storing correction data used to correct a defective image; and an image processing controller, comprising:

a defect detection circuit for detection of a defect in image data;

a defect correcting circuit for correcting defective image data based on one of the characteristics of the defect and re-correcting input from a user; and an input device for receiving the re-correcting input from the user, wherein said detection means detects an improper image portion in the image information by using infrared image data corresponding to the image information.

* * * * *